United States Patent [19]

Kobayashi et al.

[11] 4,027,265
[45] May 31, 1977

[54] UNBALANCED QUADRIPHASE DEMODULATOR

[75] Inventors: Herbert S. Kobayashi, Webster; Sydney P. Bradfield, III, Houston, both of Tex.

[73] Assignee: The United States of America as represented by the Administrator of the National Aeronautics and Space Administration, Washington, D.C.

[22] Filed: June 3, 1976

[21] Appl. No.: 692,414

[52] U.S. Cl. .............................. 329/122; 325/346; 329/104; 178/88
[51] Int. Cl.² ......................................... H03D 3/06
[58] Field of Search ............. 331/12; 329/104, 122, 329/124, 125; 325/346, 420, 421; 178/88

[56] References Cited

UNITED STATES PATENTS

| | | | |
|---|---|---|---|
| 3,594,651 | 7/1971 | Wolejsza, Jr. | 329/104 |
| 3,787,775 | 1/1974 | Lanning | 329/122 |
| 3,806,815 | 4/1974 | Fletcher et al. | 329/122 |
| 3,838,350 | 9/1974 | Ewanus | 329/122 |
| 3,878,475 | 4/1975 | Okano | 331/12 |
| 3,973,212 | 8/1976 | Walloch | 329/122 |
| 3,983,499 | 9/1976 | Tan | 339/112 |

Primary Examiner—John Kominski
Attorney, Agent, or Firm—Carl O. McClenny; John R. Manning; Marvin F. Matthews

[57] ABSTRACT

A new and improved apparatus and method for demodulation of quaternary phase shift keyed (QPSK) data, particularly unbalanced QPSK, with phase adjustment of the output of a phase-locked loop local oscillator to reduce sensitivity to amplitude variations internal to the demodulator.

18 Claims, 4 Drawing Figures

UNBALANCED QUADRIPHASE DEMODULATOR

ORIGIN OF THE INVENTION

The invention described herein was made by employees of the U.S. Government and may be manufactured and used by or for the Government of the United States of America for governmental purposes without the payment of any royalties thereon or therefor.

BACKGROUND OF THE INVENTION

1. Field of Invention

The present invention relates to demodulation of quaternary phase shift keyed (QPSK) data.

2. Description of Prior Art

Prior art communication systems have used balanced quaternary phase shift keying (QPSK) of two data bit streams onto a carrier.

Prior art QPSK demodulators, such as in U.S. Pat. No. 3,594,651, multiplied the incoming QPSK signal with a local QPSK reference signal generated by the summation of two PSK signals and formed error signals from the product of such multiplication to control the output of a voltage controlled oscillator in a phase-locked loop. These amplitude adjusting demodulators involving a summation of two signals were susceptible to gain and bias fluctuations and other factors, such as temperature, affecting gain stability or signal amplitudes.

However, where two data streams are at different data rates, it has recently been found desirable to unbalance the amount of phase shift indicating data bits, for example using 26°, 206°, −26° and −206°, to equalize bit error rate probability in the data streams. This technique is particularly of interest where the data rates are significantly different, such as in spacecraft communication. In unbalanced quadriphase modulation, the carrier phase shifts between successive samples are not multiples, such as 90°, 180°, 270°, etc., of a common phase 90° increment as was the case with balanced quadriphase, since signal power levels in the data streams differ in order to equalize bit error rate probability.

To account for the unbalance in the signal set, past quadriphase demodulators were modified to produce an error signal by summing the tracking signals in different voltage ratios defined by the power ratio between the two data channels. However, this voltage magnitude adjustment still led to sensitivity to internal amplitude changes.

SUMMARY OF THE INVENTION

Briefly, the present invention provides a new and improved method and apparatus for demodulating quaternary phase-shift keyed (QPSK), or quadriphase, data, particularly unbalanced data, from an incoming signal. A demodulating signal is formed in a local oscillator, and sent to a multiplying circuit to extract the data. In addition, the phase of the demodulating signal is adjusted to coincide with one of the four phases of the unbalanced quadriphase data. The phase adjusted demodulating signal is then multiplied with the incoming signal to generate phase tracking signals for the local oscillator. By using phase adjustment according to the present invention rather than amplitude adjustment as a demodulating technique, tracking performance is improved and sensitivity to voltage level changes caused by gain and bias variations is reduced.

It is an object of the present invention to provide a new and improved method and apparatus for demodulation of unbalanced quadriphase data.

Figure 1:
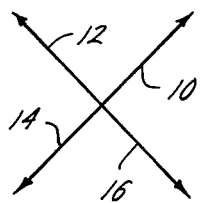
FIG. 1 is a phasor diagram of balanced quadriphase data.

DESCRIPTION OF THE PREFERRED EMBODIMENT:

In the drawings, phasors 10, 12, 14 and 16 (FIG. 1) illustrate an example prior art balanced quaternary phase-shift keyed (QPSK) data used to communicate data from two parallel bit streams. An incoming signal in phase with the phasor 10 represents binary data bits 00, for example. Similarly, incoming signals in phase with the phasors 12, 14 and 16 represent binary bits 10, 11 and 01, respectively.

It has recently been found desirable where the parallel data bit streams are at different data rates, such as in spacecraft communications and telemetry, to use differing power levels in the data bit streams in order to equalize the bit error rate probability in the data. When the power levels in the data streams differ, however, the phase shifts are unbalanced by angles whose tangents represent the ratio of the square root of the power levels.

Figure 2A:
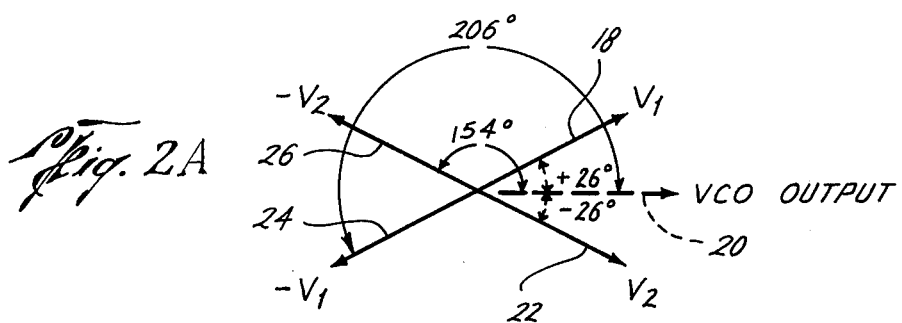
FIGS. 2A and 2B are phasor diagrams of unbalanced quadriphase data and signals used in unbalanced quadriphase demodulation according to the present invention.

Referring now to FIG. 2A, phasors are shown representing an unbalanced quadrature or quaternary phase-shift keyed data signal wherein 80 percent of available signal power is used in one data bit stream, while the remaining 20 percent of the available signal power is used in the other of the parallel data bit streams. With an 80-20 percent power allocation, an incoming signal $V_1$ represented by a phasor 18 at a phase angle of 26° with respect to a local oscillator output indicated by a phasor 20 represents data bits 11 in the two parallel data streams. Similarly, an incoming signal $V_2$, represented by phasor 22 at a phase angle of −26° with respect to the local oscillator output phasor 20 represents data bits 10 in the data bit streams. An incoming signal $-V_1$ represented by phasor 24 at a phase angle of −154°, or 206°, with respect to the oscillator phasor 20 represents data bits 00, while an incoming signal $-V_2$ represented by phasor 26 at a phase angle of −206°, or −154°, with respect to the phasor 20 indicates data bits 01. It should be understood that the phase angles set forth above are given by way of example and that other phase angles of unbalance may be used according to the present invention depending upon the allocation of power levels between the parallel bit streams to equalize the bit error rate probability therebetween.

Figure 3:
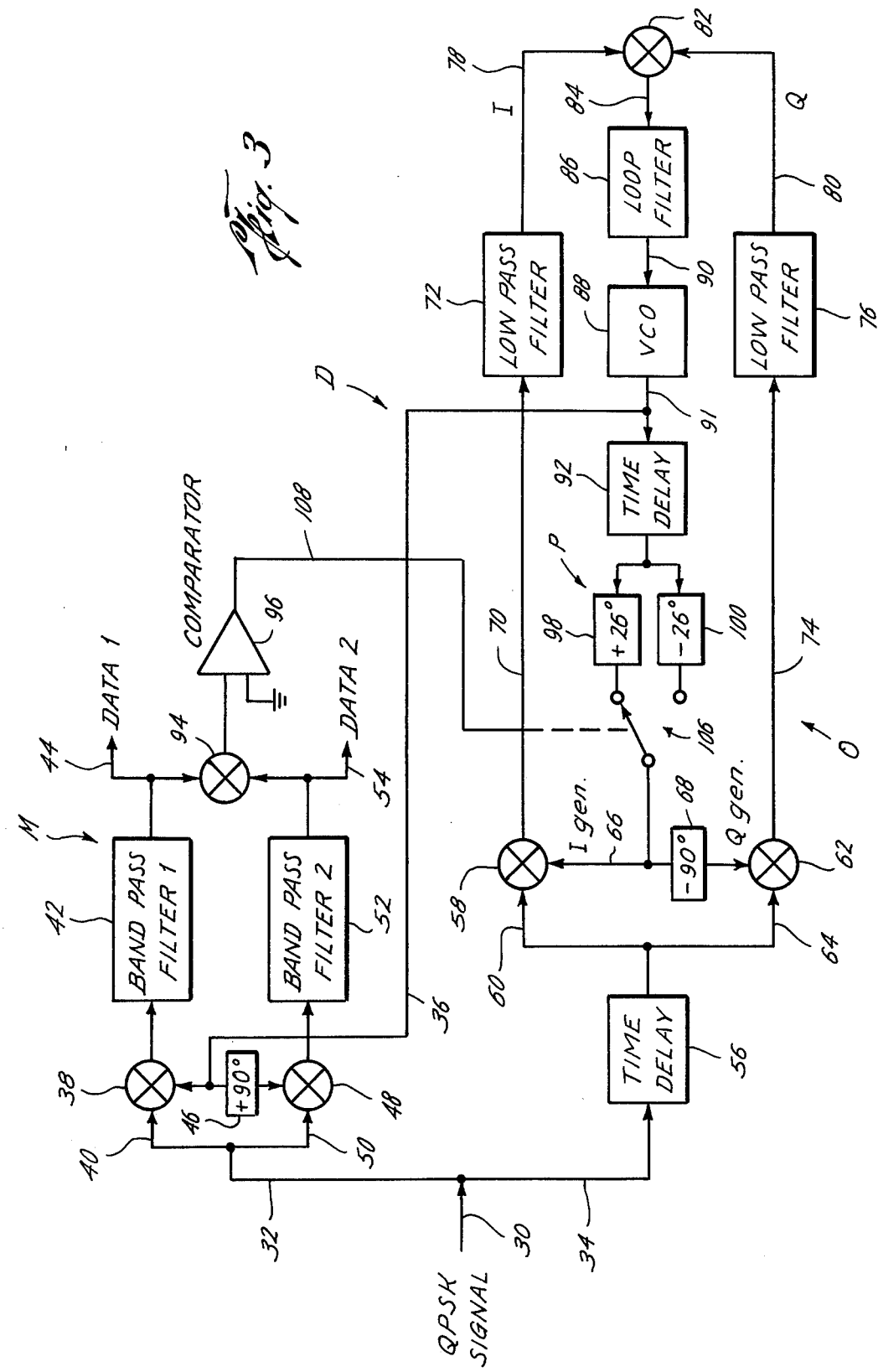
FIG. 3 is a schematic electrical circuit diagram of an unbalanced quadriphase demodulator according to the present invention.

Considering now the apparatus of the present invention (FIG. 3), a demodulator D according to the present invention receives incoming carrier signals carrying thereon unbalanced quaternary or quadrature phase-shift keyed signals over a conductor 30. The incoming signal is provided over a conductor 32 to a multiplier circuit M which demodulates the data from the incoming signal and over a conductor 34 to a local oscillator circuit 0 which forms a demodulating signal in a manner to be set forth.

The multiplying circuit M receives the demodulating signal from the oscillator circuit 0 over a conductor 36 at a first multiplier 38 which multiplies together the demodulating signal and the incoming data stream presented thereto over a conductor 40. A first bandpass filter 42 designed to pass the first of the parallel data streams is connected to the multiplier 38 to pass therefrom data bits in the first data bit stream over a conductor 44.

The demodulating signal present on the conductor 36 is also furnished to a quadrature phase shift, or +90°, circuit 46 to form a quadrature demodulating signal in phase quadrature with the demodulating signal present on conductor 36. The quadrature demodulating signal output of the circuit 46 is provided to a second multiplier 48 which multiplies the quadrature demodulating signal with the incoming signal from conductor 32 over a conductor 50 to demodulate the second of the parallel data bit streams in the incoming signal from the carrier of the incoming signal. The output of multiplier 48 is provided to a second bandpass filter 52 designed to pass the second of the parallel data bit streams so that the second of the parallel data bit streams is provided over an output conductor 54. The filters 42 and 52, of course, could be low pass filters rather than bandpass to accommodate a wider variety of data formats.

The local oscillator 0 functions as a phase-locked oscillator. In the oscillator 0, the incoming signal present on the conductor 34 is provided through a time delay circuit 56 having a time delay substantially equal to the time delay introduced in the multiplying circuit M, multiplier 94, comparator 96, and electronic switch 106. The time delayed incoming signal from the time delay circuit 56 is provided to a first oscillator multiplier 58 over a conductor 60 and to a second oscillator multiplier 62 over a conductor 64.

The first oscillator multiplier 58 receives a demodulating signal, $I_{gen}$, over an input conductor 66. The second oscillator multiplier 62 receives an oscillator demodulating signal, $Q_{gen}$, in phase quadrature with the signal, $I_{gen}$, provided to the multiplier 58 over the conductor 66 from a phase shift circuit 68 which introduces a −90° phase shift into the signal present on the conductor 66.

The multiplier 58 multiplies the demodulating signal $I_{gen}$ present on the conductor 66 with the incoming signal on the conductor 60 to form therefrom a first reference tracking signal, I, which is provided over a conductor 70 to a low pass filter 72 of the oscillator 0. Similarly, the second oscillator 62 multiplies the oscillator demodulating signal $Q_{gen}$ from the phase shift circuit 68 with the incoming signal present on the conductor 64 to form a second reference tracking signal, Q, in phase quadrature with the first reference tracking signal I. The second reference tracking signal Q formed in the multiplier 62 is provided over a conductor 74 to a second low pass filter 76 of the oscillator 0.

The filters 72 and 76 have a cut-off frequency set to pass the higher of the data bit rates in the two incoming parallel data bit streams in order to cut-off double frequency product functions formed in the multipliers 58 and 62. The output signal I and Q of the filters 72 and 76 are provided over conductors 78 and 80, respectively, to a multiplier 82 which multiplies such signals together, forming therefrom an error signal which is transmitted over a conductor 84 to a loop filter 86.

The loop filter 86 is a conventional loop filter which furnishes the error signal provided thereto over the conductor 84 to a voltage-controlled oscillator (VCO) 88 over a conductor 90. The bandwidth of the loop filter 86 is set according to the desired tracking performance of the oscillator 88 and the desired rate of acquisition of the incoming signal. The passband of the loop filter 86 should be as narrow as possible to maximize the signal-to-noise ratio in the incoming signal but sufficiently wide to compensate for doppler effects in the incoming signal where data is being sent from a moving spacecraft or the like.

As is understood by those in the art, in the phase-locked loop oscillator O, the error signal provided over the conductor 90 to the oscillator 88 controls the output frequency of the oscillator 88 and maintains the output of such oscillator 88 locked with the frequency of the incoming QPSK signal on the conductor 30. The output frequency signal from the oscillator 88 is provided over a conductor 91 to the conductor 36 for use in the multiplier circuit M, as has been set forth above, and to a time delay circuit 92 which introduces a time delay into the output signal from the oscillator 88 substantially equal to the time delay introduced into the incoming QPSK signal by the multiplying circuit M and a multiplier 94 and comparator 96, for reasons to be set forth.

With the present invention, a phase adjusting circuit P whose operation is controlled by the multiplier 94 and comparator 96 adjusts the phase of the demodulating signal from the local oscillator O to achieve phase synchronization with one of the four phases of the unbalanced phase-shift keyed data in the incoming signal. It has been found that with phase adjusting of the output of the local oscillator O by the phase adjusting circuit P to form a phase adjusted demodulating signal according to the present invention, advantages such as insusceptibility to gain and bias fluctuations or other amplitude variations internal to the demodulator are obtained.

Figure 2B:
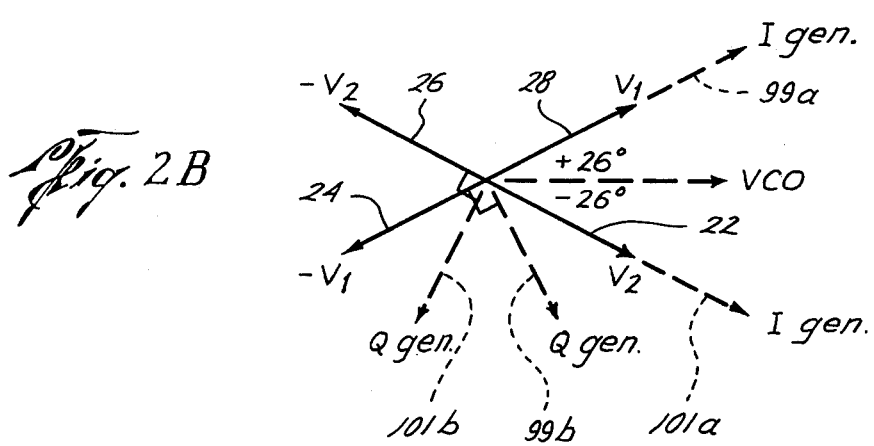

In the phase adjusting circuit P, a positive phase shift circuit 98 phase-shifts the demodulating signal from the oscillator 88 to a positive angle to form a first alternative of the local reference signal $I_{gen}$ indicated by a phasor 99a (FIG. 2B) corresponding with the angle of one of the phases of the unbalanced phase-shift keyed data. Similarly, a negative phase shift circuit 100 shifts the phase of the demodulating signal from the oscillator 88 a negative angle corresponding with the angle of one of the phases of the unbalanced phase-shift keyed data to form the other alternative for the local reference signal $I_{gen}$ indicated by a phasor 101a.

The alternative output signals from the phase shift circuits 98 and 100 for the local reference signal $I_{gen}$ are selectively provided through a switch 106 over the conductor 66 to the multiplier 58 and through the phase shift circuit 68 to the multiplier 62 for use in forming the second reference tracking signal $Q_{gen}$ in phase quadrature with the signal $I_{gen}$. The alternate phase quadrature local reference signals $Q_{gen}$ are indicated by phasors 99b and 101b, in phase quadrature with the phasors 99a and 101a, respectively. The switch 106 is responsive to and controlled by the output from the comparator 96 as indicated schematically by line 108 and may be any suitable polarity responsive electronic switching device.

The multiplier 94 forms a polarity signal controlling the operation of the comparator 96 and the switch 106 by multiplying together the output data streams received over the conductors 44 and 54. The multiplier 94 forms a product signal indicating by the polarity thereof whether the output demodulating signal $I_{gen}$ from the oscillator 88 is to be shifted positively or negatively in phase in order to bring such demodulating signal into phase synchronization with the incoming data. When the output product signal from the multiplier 94 is positive, the comparator 96 forms a signal causing the switch 106 to provide the output signal from the positive phase shift network 98 to the multipliers 58 as the local reference signal $I_{gen}$, as indicated schematically in the drawings. Conversely, when the output of the multiplier 94 is negative, comparator 96 forms a signal causing the switch 106 to provide the output of the negative phase shift circuit 100 to the multiplier 58 as the local reference signal $I_{gen}$.

In the operation of the present invention, the incoming quadrature phase-shift keyed data is provided to the multiplying circuit M to demodulate the two parallel data bit streams of data with the multipliers 38 and 48. The voltage-controlled oscillator 88 of the local oscillator 0 forms the demodulating signal for use in the multiplier M. The output of the oscillator 88 is further provided through the phase-shifting circuit P, as the local reference signal $I_{gen}$, to the multiplier 58 and in quadrature as the signal $Q_{gen}$ to the multiplier 62 to form the first and second reference tracking signals I and Q. The reference tracking signals I and Q are furnished to the multiplier 82 to form an error signal controlling the output frequency of the oscillator 88 and keeping the demodulating signal locked to track the frequency of the input QPSK signal on the conductor 30.

The demodulating signal formed in the oscillator 88 is further provided through the phase-shifting circuit P. In the phase-shifting circuit P, the outputs from the phase shift circuit 98 and the phase shift circuit 100 are selectively provided through the switch 106 to the multipliers 58 and 62. In this manner, the phase of the demodulating signal is selectively adjusted positively or negatively by the switch 106 according to the output from the comparator 96 in order to bring the demodulating signal into phase alignment with the incoming data. By adjusting the phase of the demodulating signal in the demodulator D according to the present invention rather than attempting to rely on amplitude levels, susceptibility to gain and bias fluctuations and sensitivity to other amplitude variations in the demodulator is overcome.

It should be understood that the phase shifts introduced into the output of the oscillator 88 by the phase shift circuits 98 and 100 are representative and not included by way of limitation, since as has been set forth the particular amount of unbalanced phase shift in the incoming data is determined by the relative power levels of the signals in the two parallel data bit streams of the incoming data. Further, it should be understood that the phase adjusting demodulation technique of the present invention is also suitable for use with balanced phase-shift keyed data. In such a situation, the phase shifts imposed by the phase shift networks 98 and 100 would be +45° and −45°, while the filters 42 and 52 would be centered at a like center frequency.

The foregoing disclosure and description of the invention are illustrative and explanatory thereof, and various changes in the size, shape and materials as well as in the details of the illustrated construction may be made without departing from the spirit of the invention.

We claim:
1. An apparatus for demodulating quaternary phase-shift keyed data from an incoming signal, comprising:
   a. local oscillator means for forming a demodulating signal;
   b. phase adjusting means for adjusting the phase of the demodulating signal to achieve phase synchronization with one of the four phases of the quaternary phase-shift keyed data in the incoming signal; and
   c. means for multiplying the demodulating signal with the incoming signal to demodulate the data therefrom.

2. The apparatus of claim 1, wherein the incoming data represents two parallel data bit streams and said means for multiplying comprises:
   a. first multiplier means for multiplying the demodulating signal with the incoming signal to demodulate a first one of the parallel data bit streams from the incoming signal;
   b. quadrature means for forming a quadrature demodulating signal in phase quadrature with the demodulating signal; and
   c. second multiplier means for multiplying the quadrature demodulating signal with the incoming signal to demodulate the second of the parallel data bit streams from the incoming signal.

3. The apparatus of claim 1, wherein said phase adjusting means comprises:
   a. positive phase shift means for phase shifting the demodulating signal an angle corresponding with the angle of one of the phases of the unbalanced phase-shift keyed data; and
   b. negative phase shift means for phase shifting the demodulating signal an angle corresponding with the angle of one of the phases of the unbalanced phase-shift keyed data.

4. The apparatus of claim 1, further including:
   a. first oscillator multiplier means for multiplying the phase adjusted demodulating signal with the incoming signal to form a first reference tracking signal;
   b. means for forming an oscillator demodulating signal in phase quadrature with the phase adjusted demodulating signal; and
   c. second oscillator multiplier means for multiplying the oscillator demodulating signal with the incoming signal to form a second reference tracking signal in phase quadrature with the first reference tracking signal.

5. The apparatus of claim 4, wherein said local oscillator means comprises:
   a. multiplier means for multiplying the first and second reference tracking signals together to form an error signal;
   b. voltage controlled oscillator means for forming the demodulating signal in response to the error signal from said multiplier means.

6. The apparatus of claim 5, further including:
   loop filter means responsive to the error signal for determining the acquisition and tracking performance of the demodulator.

7. The apparatus of claim 4, wherein said phase adjusting means comprises:

a. positive phase shift means for phase shifting the demodulating signal an angle corresponding with the angle of one of the phases of the unbalanced phase-shift keyed data; and b. negative phase shift means for phase shifting the demodulating signal an angle corresponding with the angle of one of the phases of the unbalanced phase-shift keyed data.

8. The apparatus of claim 7, further including:
switch means for selectively providing the output of said positive phase shift means or said negative shift means to said first oscillator multiplier means and said means for forming an oscillator demodulating signal.

9. The apparatus of claim 8, wherein the incoming data represents two parallel data streams and further including:

a. multiplier means for forming a product of the two parallel data streams; and b. comparator means for controlling said switch means based on the polarity of the product formed in said multiplier means.

10. The apparatus of claim 1, further including:
loop filter means for determining the acquisition and tracking performance of the demodulator.

11. The apparatus of claim 1, wherein the incoming data is unbalanced quaternary phase-shift keyed data, and wherein:
said phase adjusting means comprises means for adjusting the phase of the demodulating signal to achieve phase synchronization with one of the four phases of the unbalanced phase-shift keyed data in the incoming signal.

12. A method of demodulating quaternary phase-shift keyed data from an incoming signal comprising the steps of:

a. forming a demodulating signal;

b. adjusting the phase of the demodulating signal to achieve phase synchronization with one of the four phases of the phase-shift keyed data in the incoming signal; and c. multiplying the demodulating signal with the incoming signal to demodulate the data therefrom.

13. The method of claim 12, wherein said incoming data represents two parallel data bit streams and said step of multiplying comprises:

a. multiplying the demodulating signal with the incoming signal to demodulate a first one of the parallel data bit streams from the incoming signal;

b. forming a quadrature demodulating signal in phase quadrature with the demodulating signal; and c. multiplying the quadrature demodulating signal with the incoming signal to demodulate the second of the parallel data bit streams from the incoming signal.

14. The method of claim 12, wherein said step of phase adjusting comprises the step of:
selectively shifting the phase of the demodulating signal a negative or positive angle corresponding with the angle of one of the phases of the unbalanced phase-shift keyed data.

15. The method of claim 12, further including the steps of:

a. multiplying the phase adjusted demodulating signal with the incoming signal to form a first reference tracking signal;

b. forming an oscillator demodulating signal in phase quadrature with the phase adjusted demodulating signal; and c. multiplying the oscillator demodulating signal with the incoming signal to form a second reference tracking signal in phase quadrature with the first reference tracking signal.

16. The method of claim 15, wherein said step of forming a demodulating signal comprises the steps of:

a. multiplying the first and second reference tracking signals together to form an error signal;

b. forming the demodulating signal in response to the error signal so formed.

17. The method of claim 15, wherein said incoming data represents two parallel data bit streams and said step of multiplying comprises:

a. multiplying the demodulating signal with the incoming signal to demodulate a first one of the parallel data bit streams from the incoming signal;

b. forming a quadrature demodulating signal in phase quadrature with the demodulating signal; and c. multiplying the quadrature demodulating signal with the incoming signal to demodulate the second of the parallel data bit streams from the incoming signal.

18. The method of claim 12, wherein the incoming data is unbalanced quaternary phase-shift keyed data, and wherein:
said step of adjusting comprises adjusting the phase of the demodulating signal to achieve phase synchronization with one of the four phases of the unbalanced phase-shift keyed data in the incoming signal.

* * * * *